(No Model.)
F. GUILLEAUME & E. GOLTSTEIN.
CLOSURE.
No. 541,745. Patented June 25, 1895.
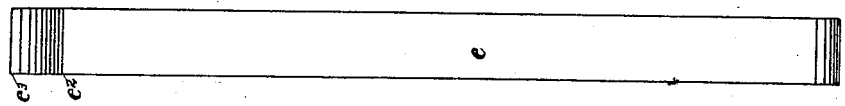
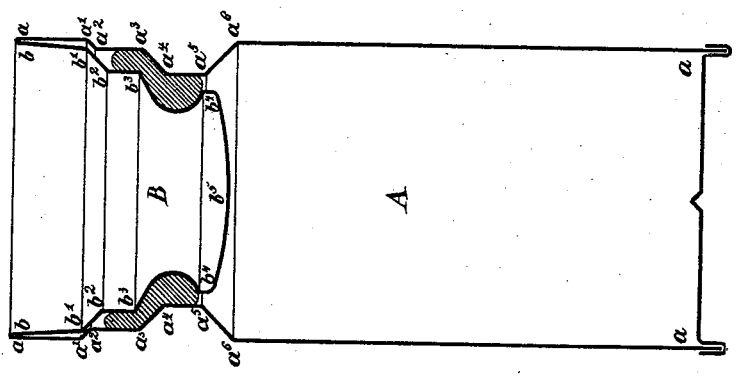
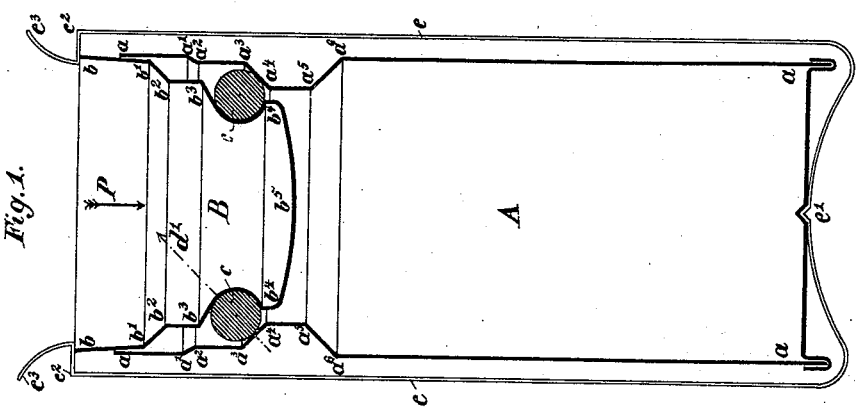

UNITED STATES PATENT OFFICE.

FRANZ GUILLEAUME AND EWALD GOLTSTEIN, OF BONN, GERMANY.

CLOSURE.

SPECIFICATION forming part of Letters Patent No. 541,745, dated June 25, 1895.

Application filed December 3, 1894. Serial No. 530,739. (No model.)

*To all whom it may concern:*

Be it known that we, FRANZ GUILLEAUME and EWALD GOLTSTEIN, subjects of the King of Prussia, German Emperor, residing at Bonn, in the Kingdom of Prussia, Germany, have invented a new and useful Improvement in Lid-Fasteners for Jars, Tins, and other Vessels, whereof the following is a specification.

Our invention relates to means for securing the lids or covers of vessels such as jars or tins used for keeping preserves, and has for its object to secure a permanent air tight fastening of the cover or lid to the vessel simply by means of the external air pressure on the said lid.

In the annexed drawings, Figures 1 and 2 show in vertical section the vessel with the lid in two positions. Fig. 3 is a side view of the clamp for holding the lid.

In the upper part of the cylindrical vessel, jar or tin A is provided an internal double shoulder of the shape indicated by the letters $a'$ to $a^6$. The cover B is stamped in the shape as shown by the letters $b$ to $b^5$ and the cylindrical part $b\ b'$ is so dimensioned that it can easily slide up and down in the cylindrical part $a\ a'$ of the vessel without allowing any lateral movement. A washer $c$ of india rubber or other suitable material is placed in the recess $b^3\ b^4$ of the lid, the washer $c$ being of such dimension that, when in the position shown in Fig. 1, it just touches the conical part $a^3\ a^4$ of the vessel without reaching the cylindrical part $a^2\ a^3$. The lid is then pressed down with a certain force P on the vessel whereby an air tight joint is secured. If now the vessel is heated the contents of the same expand and the vapors or gases lift the cover B against the pressure of the force P so that they may escape between the washer $c$ and the conical part $a^3\ a^4$ of the vessel and the cylindrical parts $a\ a'$ and $b\ b'$ of the vessel and the lid respectively.

As soon as the supply of heat ceases, the force P will hold the lid on the vessel so as not to admit any access of air, and on the vessel getting gradually cool there will be a partial vacuum in the interior of the same under the influence of which the lid will sink down into the position shown in Fig. 2. In this position the washer is deformed and is squeezed with considerable force between the surfaces $a^2\ a^3\ a^4\ a^5$ of the vessel and $b^2\ b^3\ b^4$ of the cover. The pressure of the washer being solely in horizontal direction fully compensates the pressure of the conical part $a^3\ a^4$ of the shoulder of the vessel in the direction of the arrow $d'$ so that there is no tendency to lift the lid B from the vessel. The small shoulder $a'\ a^2$ of the vessel and the corresponding conical part $b'\ b^2$ of the lid prevent the lid from being pressed too far down into the vessel. The lid B remains in the position shown in Fig. 2 and effects a permanent air tight joint. It can only be removed when the contents of the vessel are to be consumed by applying considerable force or by pressing a hole through the bottom of the lid by which the vacuum is destroyed.

The weight or the force P by which the lid is held down on the vessel before the vessel is heated must be so small that a certain pressure in the interior of the vessel will slightly lift the lid and allow the escape of the gases or vapors. For this purpose I preferably employ a two armed resilient clamp $e$ shown in Figs. 1 and 3, which by a small projection $e'$ engaging with a corresponding recess in the center of the bottom of the vessel is held in proper position and which with the hooks $e^2\ e^2$ holds the lid B down on the vessel A. The ends $e^3\ e^3$ of the arms of the clamp are bent upward to allow the clamp to be easily put in and out of place.

When the vessel is cooled and the lid is pressed down by the pressure of the external air (see Fig. 2) the clamp is removed.

We claim as our invention—

The combination of a cylindrical vessel, provided in its upper part with an internal small shoulder $a'\ a^2$ and a conical shoulder $a^3\ a^4$, with a lid B, the upper cylindrical part $b\ b'$ of which is capable of sliding in the cylindrical part $a\ a'$ of the vessel and which is provided with a conical shoulder $b\ b'$ to meet with the said shoulder $a^3\ a^4$ for preventing the lid from being pressed too far down in the vessel, and recess $b^3\ b^4$, which latter contains the washer $c$, essentially as and for the purpose described.

In testimony whereof we have hereunto set our hands in the presence of two subscribing witnesses.

FRANZ GUILLEAUME.
    EWALD GOLTSTEIN.

Witnesses:
 FRITZ SCHRÖDER,
 SOPHIE NAGEL.